United States Patent
Fischer

(10) Patent No.: US 6,672,292 B2
(45) Date of Patent: Jan. 6, 2004

(54) FLUID INLET FOR INTRODUCING A HOT FLUID INTO A HOLLOW STRUCTURE

(75) Inventor: Jochem Fischer, Marbach (DE)

(73) Assignee: Filterwerk Mann & Hummel GmbH, Ludwigsburg (DE)

(*) Notice: Subject to any disclaimer, the term of this patent is extended or adjusted under 35 U.S.C. 154(b) by 89 days.

(21) Appl. No.: 10/104,066

(22) Filed: Mar. 25, 2002

(65) Prior Publication Data

US 2002/0158151 A1 Oct. 31, 2002

Related U.S. Application Data

(63) Continuation of application No. PCT/EP00/09141, filed on Sep. 19, 2000.

(30) Foreign Application Priority Data

Sep. 24, 1999 (DE) .......................... 199 45 769

(51) Int. Cl.[7] .............................................. F02M 25/07
(52) U.S. Cl. ................................................. 123/568.17
(58) Field of Search ....................... 123/568.11, 568.17, 123/568.18, 184.21

(56) References Cited

U.S. PATENT DOCUMENTS

| | | | | |
|---|---|---|---|---|
| 5,533,487 | A | * 7/1996 | Cailey | ................. 123/568.17 |
| 6,343,594 | B1 | * 2/2002 | Koeslin et al. | ........ 123/568.17 |
| 6,386,188 | B1 | * 5/2002 | Bender | .................. 123/568.12 |
| 6,439,212 | B1 | * 8/2002 | Coleman et al. | ....... 123/568.17 |
| 6,513,508 | B2 | * 2/2003 | Fischer et al. | ......... 123/568.17 |

FOREIGN PATENT DOCUMENTS

| | | |
|---|---|---|
| DE | 19740998 | 3/1998 |
| EP | 0736683 | 10/1996 |
| EP | 0753656 | 1/1997 |
| EP | 0886063 | 12/1998 |
| JP | 5828583 | 2/1983 |

\* cited by examiner

Primary Examiner—John Kwon
(74) Attorney, Agent, or Firm—Crowell & Moring LLP

(57) ABSTRACT

A fluid inlet suitable for introducing a hot exhaust gas into the air intake tract of an internal combustion engine. The exhaust gas is conducted through an inlet pipe (15) and a deflector (18) into the intake pipe or tract (13). A preferably tubular insert (23) is disposed in the intake tract (13). The insert has walls (22) which are oriented in the direction of flow of the aspirated exhaust gas. The fluid inlet reduces the thermal stress on the walls of the intake tract (13) to a minimum and makes high exhaust recovery or recirculation rates possible. In order to additionally support cooling of the insert, the insert may be provided with apertures (26) through which a secondary air current of the intake air which flows through an intermediate chamber (25) can shift to the interior of the tube in order to achieve film cooling of the insert (23).

11 Claims, 1 Drawing Sheet

FLUID INLET FOR INTRODUCING A HOT FLUID INTO A HOLLOW STRUCTURE

CROSS REFERENCE TO RELATED APPLICATIONS

This application is a continuation of international patent application no. PCT/EP00/09141, filed Sep. 19, 2000, designating the United States of America, the entire disclosure of which is incorporated herein by reference. Priority is claimed based on Federal Republic of Germany patent application no. DE 199 45 769.7, filed Sep. 24, 1999.

BACKGROUND OF THE INVENTION

The present invention relates to a fluid inlet, which can be used, in particular, as an exhaust gas recirculation inlet in the intake system of an internal combustion engine.

It is known in the art to recirculate exhaust gases into the intake system of an internal combustion engine. This measure is taken to reduce the emission of harmful substances by the internal combustion engine. The high temperature of the exhaust gas, however, is problematic. Particularly if the intake system is made of synthetic resin material (i.e., plastic), the introduction of the exhaust gas can cause the intake system to melt in the area of the exhaust gas inlet.

To prevent excessive thermal stress of the intake system, European patent no. EP 486,338 proposes an exhaust gas feed line with a double-walled construction. The exhaust gas is fed through the inner pipe into the intake system. The hollow space resulting between the two walls has an insulating effect relative to the contact point of the exhaust gas feed line and the intake pipe.

To achieve an additional cooling effect, a portion of the fresh intake air is guided through the gap. This fresh air is taken from a throttle valve and reaches the gap via a bypass line. The cooling air returns to the intake system through corresponding openings parallel to the exhaust gas stream.

In this proposed solution, however, the proportion of recirculated exhaust gas to passing combustion air cannot be increased at will. The double-walled pipe is connected directly to the intake pipe such that, with higher recirculation rates, there is nevertheless a risk that the wall of the intake system will melt. Furthermore, the hot exhaust gas stream strikes the opposite wall of the intake system unchecked and causes high thermal stress in this area, too, which can lead to component failure.

To prevent this European patent application no. EP 886, 063 proposes a gas conducting element 26 (cf. FIG. 2) with a high thermal loading capacity, which protects the wall of the intake system against a direct impact of the hot exhaust gas stream. Within this gas conducting element, the hot exhaust gas stream has sufficient time to mix with the intake air. Furthermore, the gas conducting element is made of a heat-resistant material. This material has a high thermal stability and can therefore intermediately store or conduct heat peaks in the introduced exhaust gas and release them again during operating states that develop less heat.

This component, however, increases the weight of the unit. This is undesirable particularly in mobile applications, e.g., in motor vehicles. Furthermore, the gas conducting element increases the material and production costs for the intake system.

SUMMARY OF THE INVENTION

It is therefore an object of the present invention to provide an improved fluid inlet for introducing a hot fluid into a hollow structure.

Another object of the invention is to provide a fluid inlet for introducing a hot fluid into a stream of cooler fluid flowing through a duct or pipe.

It is also an object of the invention to provide a fluid inlet for introducing a hot fluid into a hollow structure which will effectively protect the hollow structure against damage due to thermal stress resulting from introduction of the hot fluid.

A further object of the invention is to provide a fluid inlet for introducing a hot fluid into a hollow structure which is cost-effective to produce.

An additional object of the invention is to provide an inlet for introducing a hot fluid into a hollow structure which has a low overall weight.

These and other objects are achieved in accordance with the present invention by providing a fluid inlet for introducing a hot fluid into a hollow structure, comprising a hollow structure for conducting a stream of a fluid; an inlet feed connection to introduce a hot fluid into the hollow structure; and an insert mounted inside the hollow structure having a wall surrounding the inlet feed connection to shield the hollow structure from hot fluid introduced through the inlet connection; in which the inlet connection has a higher thermal stability than the hollow structure and is heat-resistant relative to said hot fluid, and in which the insert shields interior walls of the hollow structure against the introduced hot fluid, and the walls of the insert are at least substantially aligned in the flow direction of the introduced fluid.

The fluid inlet according to the invention comprises three structural functional areas: the hollow structure, the inlet connection, and an insert. The hollow structure is suitable for conducting a fluid and may, for instance, comprise an intake pipe for an internal combustion engine. The inlet connection is suitable to be connected to a supply line or duct through which the hot fluid to be introduced is supplied. These components are interconnected.

The described fluid inlet must be designed for the thermal stresses caused by the introduction of the hot fluid. This means that the inlet connection must be heat-resistant to the fluid being introduced. For the hollow structure, however, materials with a lower melting point, such as thermoplastic synthetic resin materials, are frequently used. These materials would melt if the fluid being introduced impinged directly against them, which would lead to component failure. To prevent this, an insert is provided in the hollow structure according to the invention in the area where the introduced fluid would strike the walls of the hollow structure. This insert is characterized in that it has walls with inner surfaces that are at least substantially aligned with the direction of flow of the introduced fluid. This prevents the introduced fluid from striking the insert directly. The flow of the introduced fluid will therefore gradually conform to the insert, so that significantly less heat is transferred to the insert than would be the case if the flow impacted it directly. This effect is further enhanced in that the introduced fluid is mixed with the passing fluid before it strikes the insert, so that the fluid mixture is cooled. This, too, reduces the thermal stress on the insert.

The advantage achieved by the invention can be used in different ways. Compared to insert elements used in the prior art, the insert can be provided with thinner walls to save weight. The low thermal capacity of the insert is compensated by the lower thermal stress. Another possibility is to select a material with a lower melting point for the insert. Even plastics with a high melting point can be considered here. This will reduce the component weight and permit cost-effective production of the insert. A plastic component can furthermore be more easily disposed of, e.g., by incineration.

A third possibility of using the described advantage is an increase in the temperature of the fluid being introduced. A particularly suitable application is found in the automotive area if the fluid supply line is used to recirculate exhaust gas into the intake system of an internal combustion engine. Especially in modern diesel engines, a high exhaust gas recirculation rate is required in certain operating states to meet the required exhaust gas emission values. These high exhaust gas recirculation rates can be realized with economically produced parts if the described design principle is followed.

In accordance with a further embodiment of the inventive concept, a space or gap is provided between the insert and the walls of the hollow structure. This gap insulates the hollow structure relative to the insert if the fluid passing through the hollow structure has a lower heat conduction coefficient than the insert. The hollow structure can be designed as a bypass line segment for the fluid passing through. In this case, the flow passing through does not mix with the fluid being introduced, so that it has additional cooling properties relative to the insert, which is being heated. In this way the thermal stress of the insert can be reduced even further.

A further variant of the invention is created by providing the walls of the insert with apertures or openings, which connect the aforementioned gap with the inner surface of the insert. The fluid flow along the inner surfaces of the insert has an ejector effect at the openings causing the cool fluid passing through to be aspirated out of the gap. The fluid passing through, which is being mixed with the introduced fluid and thereby heated, flows along the inner surfaces. The fluid sucked through the openings initially forms a film on the inner surface of the insert, thereby creating a cooling shield, which displaces the hotter fluid flow attacking from within. This further reduces the thermal stress on the insert, so that the described advantages of the invention can be used more efficiently.

In accordance with one particularly preferred embodiment of the invention, the described flow effects can be used especially efficiently if the walls of the insert are closed in the form of a ring. This creates a mixing segment that is enclosed by the inner surfaces of the insert, which the introduced fluid enters together with the passing fluid. It is advantageous to provide this mixing segment with a circular cross section. Such regular cross-sectional shapes can most reliably influence the flow conditions prevailing at the fluid feed line.

A further variant of the invention is obtained if the inlet connection is provided with a curvature. This curvature is selected such that the fluid being introduced is redirected in the direction of the fluid passing through the hollow structure. This makes it possible to optimally align the insert within the hollow structure, so that it offers no significant flow resistance to either the fluid passing through the hollow structure or to the introduced hot fluid. This is an advantage since it reduces the possible heat exchange between the heated fluids and the insert.

A further advantageous embodiment of the heat transfer reducing member is to use a double wall construction for the inlet connection. Such an inlet connection has an inner wall and an outer wall, and the fluid in the gap between these walls acts as an insulator. The fluid being introduced is guided through the cross section formed by the inner walls.

An alternative solution for the fluid feed line is to provide the end area of the inlet connection, which extends into the interior of the hollow structure, with outlet openings that point in the flow direction of the fluid passing through. With this design measure, the flow of the introduced fluid is guided in the direction of the flow inside the hollow structure. Using the ejector effect, the introduced fluid is caught and carried along by the flow of the fluid passing through the hollow structure, which causes rapid mixing. This mixing simultaneously cools the fluid being introduced and heats the fluid passing through. The resulting temperature, however, is still within the range of the permissible thermal stress of the inner surface of the insert.

These outlet openings preferably are arranged along the sides in the end area of the feed connection. A large number of openings improves the mixing effect, since the flow of the fluid being introduced is separated into many small partial streams.

According to a further embodiment of the invention, the outlet openings are provided with baffles. Particularly if the inlet connection is made of sheet metal, these baffles can be simply produced by stamping. Preferably, the baffles are bent into the interior of the inlet connection and thereby cause optimal mixing of the fluid being introduced with the fluid passing through. These baffles furthermore cause the introduced fluid flow to conform to the end area of the inlet connection as it exits, so that direct contact of the introduced fluid with the walls of the hollow structure is avoided. Such contact occurs only after a sufficient mixing segment in the further course of the flow passing through the hollow structure.

To further enhance the mixing of the two fluids, it is advantageous to provide the inlet connection with a streamlined or flow-optimized outer contour relative to the flow passing through the hollow structure. As the fluid flows around the inlet connection, a laminar flow results along the outer contour of the inlet connection, particularly in its end areas. This improves the mixing result with the fluid being introduced.

In accordance with one advantageous embodiment of the inventive concept, the connecting structure is produced in the form of a bayonet lock in order to facilitate mass production. This creates a module that can be easily integrated into the hollow structures. The corresponding seat as the counterpart of the bayonet catch can be integrated in the wall structure, especially if these structures are made of synthetic resin material. The inlet connection and the connecting structure can be configured as standard components, so that high numbers of units can be achieved. This increases the economic efficiency of the arrangement. The bayonet lock makes it easy to mount the fluid feed line, so that the reduced assembly complexity further increases the economic efficiency of the fluid supply line.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

Figure 1:
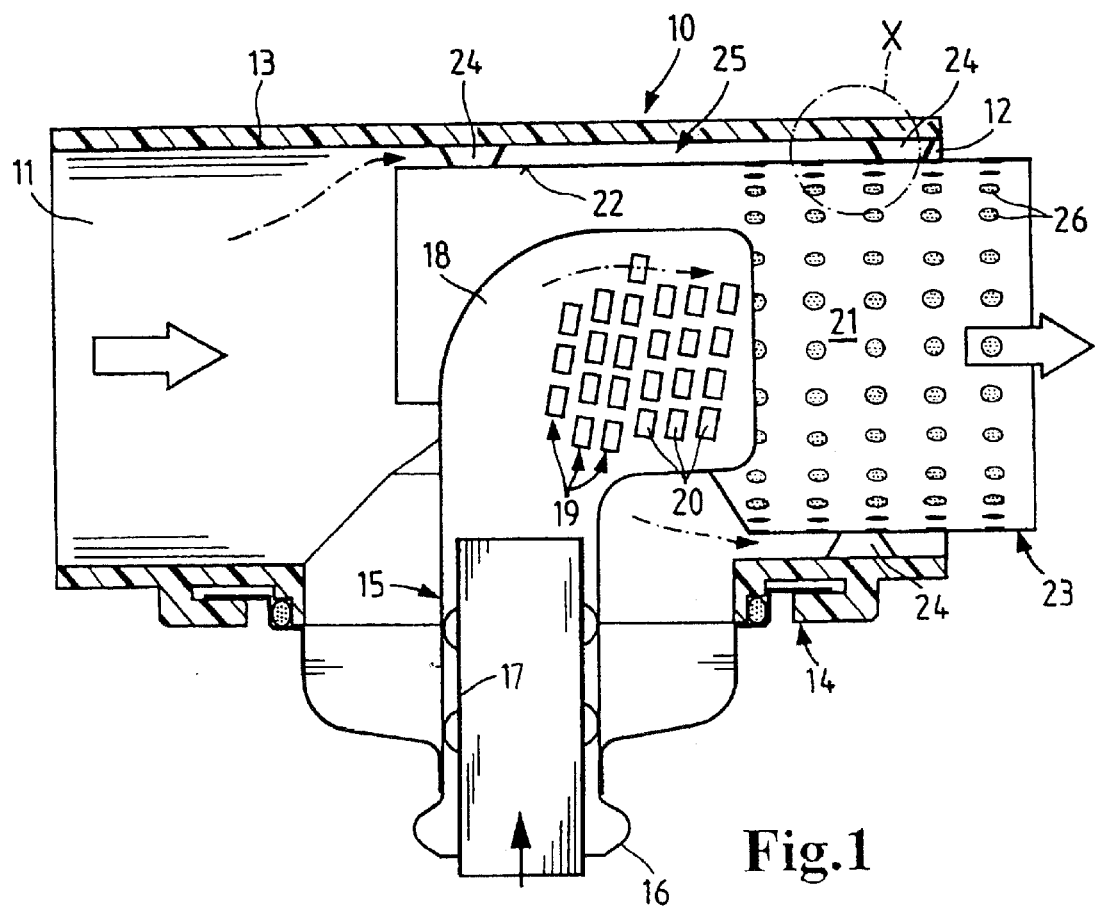
FIG. 1 is a longitudinal section through a fluid supply line.

A fluid supply pipe or duct 10 according to FIG. 1 represents a section of an intake system (not illustrated in further detail) for an internal combustion engine. This section is comprised of a hollow structure 13, which is provided with an inlet 11 and an outlet 12 to enable a flow of intake air (identified by wide arrows) to pass through the duct. The inlet and the outlet can be understood as interfaces of the fluid feed system that is being considered.

An exhaust recycle inlet connection 15 is attached to the hollow structure by a bayonet catch 14. This inlet connection has a connecting element 16 that can be connected to an exhaust gas recirculation line (not shown). Thin arrows indicate the flow of the exhaust gas.

The inlet connection is double-walled. The inner pipe 17 serves as insulation so as to prevent excessive heating of the hollow structure 13 via the bayonet catch. The double-walled part of the feed connection is adjoined by a curvature 18, which redirects the exhaust gas in the direction of flow of the intake air flowing through hollow structure 10. Outlet openings 19 with baffles 20 are provided in this area of the curvature and thereby permit the exhaust gas to be introduced in a directional manner into the hollow structure. The curved area of the feed connection has a smooth, streamlined configuration, so that the intake air can easily flow around it and can carry along the exhaust gas.

The outlet openings 19 open out into a mixing segment 21, which is formed by the inner surface 22 of a tubular insert 23. This insert is held inside the hollow structure 13 by mounting ribs 24. The outside diameter of the insert is smaller than the inside diameter of the hollow structure. This creates a gap 25, through which the intake air can flow. Broken line arrows identify this secondary airflow.

Figure 2:
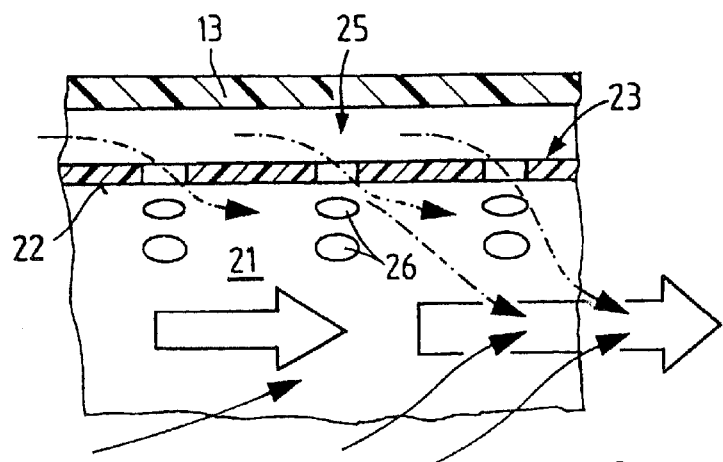
FIG. 2 shows a detail X from FIG. 1 with arrows schematically indicating different fluid flows.

The course of the secondary intake airflow within gap 25 is illustrated in FIG. 2. The secondary airflow flows through gap 25 in the same direction as the primary intake airflow (wide arrows) and reaches the mixing segment 21 through openings 26 in the wall of the insert. There, it is carried along by the primary flow and at the same time forms a thin film of cooler intake air along the inner surface 22 of the insert. At the same time, at some distance from the inner surface, the primary airflow mixes with the introduced exhaust gas (solid thin arrows). This establishes an average temperature of the primary airflow, which the walls of the hollow structure behind the mixing segment (not shown) can withstand.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A fluid inlet for introducing a hot fluid into a hollow structure, comprising:

a hollow structure for conducting a stream of a fluid;

an inlet feed connection to introduce a hot fluid into the hollow structure; and an insert mounted inside the hollow structure having a wall surrounding the inlet feed connection to shield the hollow structure from hot fluid introduced through the inlet connection;

wherein the inlet connection has a higher thermal stability than the hollow structure and is heat-resistant relative to said hot fluid, and wherein the insert shields interior walls of the hollow structure against the introduced hot fluid, and the walls of the insert are at least substantially aligned in the flow direction of the introduced fluid.

2. A fluid inlet according to claim 1, wherein said hollow structure is a section of an intake tract for an internal combustion engine, and said inlet connection is provided with a connecting element for attaching an exhaust gas recirculation line.

3. A fluid inlet according to claim 1, wherein a gap is provided between the insert and the walls of the hollow structure.

4. A fluid inlet according to claim 2, wherein the walls of the insert are provided with openings communicating between said gap and the interior of said insert.

5. A fluid insert according to claim 1, wherein the walls of the insert form a tubular member which defines a mixing zone for mixing the introduced hot fluid with the fluid stream conducted through the hollow structure.

6. A fluid inlet according to claim 5, wherein the mixing zone has a circular cross section.

7. A fluid inlet according to claim 1, wherein the inlet connection has a curved deflector section for redirecting introduced hot fluid in the flow direction of the fluid stream conducted through the hollow structure.

8. A fluid inlet according to claim 1, wherein the inlet connection is double-walled, and the hot fluid being introduced is conducted through an inner pipe of said inlet connection.

9. A fluid inlet according to claim 4, wherein said openings are provided with baffles to direct hot fluid introduced through the inlet connection in the flow direction of the fluid stream conducted through the hollow structure.

10. A fluid inlet according to claim 1, wherein the inlet connection has a smooth, streamlined outer contour to minimize interference with the flow of the fluid stream conducted through the hollow structure.

11. A fluid inlet according to claim 1, wherein the inlet connection is fastened to the hollow structure by a bayonet lock.

* * * * *